Figures 3, 4:
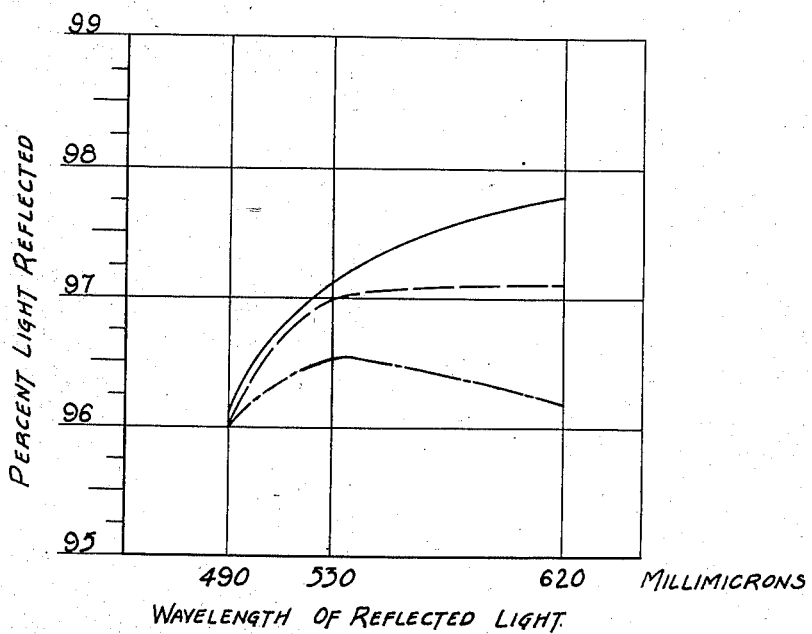

Aug. 29, 1939.       R. DAHLSTROM       2,170,940
WHITE TITANIUM DIOXIDE PIGMENT
Filed Dec. 24, 1936       2 Sheets-Sheet 1
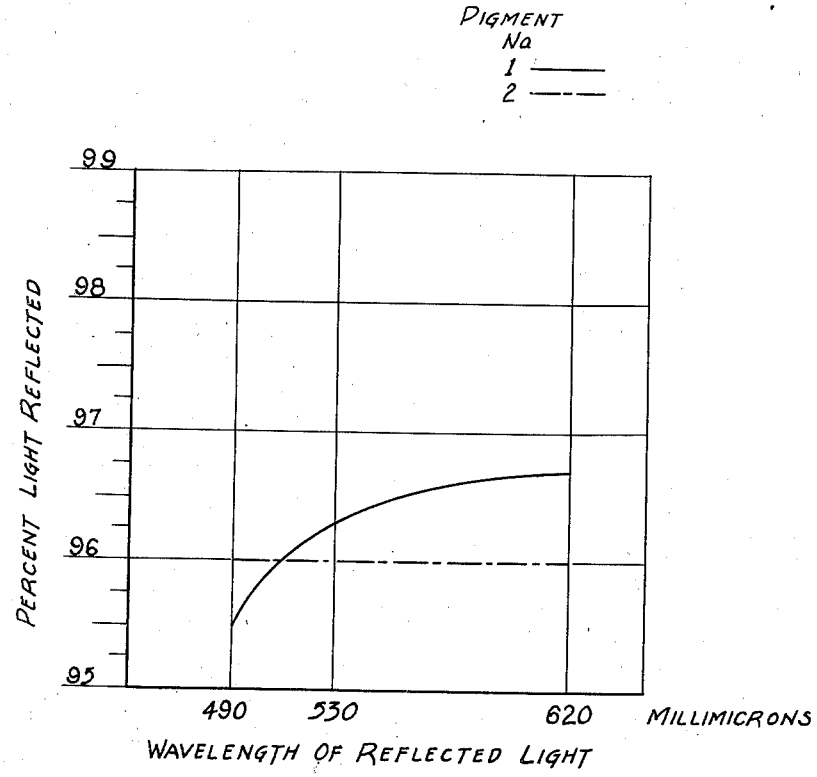
INVENTOR.
ROY DAHLSTROM.
BY
ATTORNEY.

Aug. 29, 1939.  R. DAHLSTROM  2,170,940
WHITE TITANIUM DIOXIDE PIGMENT
Filed Dec. 24, 1936   2 Sheets-Sheet 2

| TABLE B | | | | |
|---|---|---|---|---|
| PIGMENT No. | EXPOSURE TO REDUCING ATMOSPHERE - SECONDS. | BLUE | GREEN | RED |
| | | MILLIMICRONS | | |
| | | 490 | 550 | 620 |
| 3 | 0 | 96.1 | 97.1 | 97.8 |
| 4 | 2 | 96.0 | 97.0 | 97.1 |
| 5 | 3 | 96.0 | 96.5 | 96.2 |

INVENTOR.
ROY DAHLSTROM.
BY Charles F. Kaegebehn
ATTORNEY.

Patented Aug. 29, 1939

2,170,940

UNITED STATES PATENT OFFICE 2,170,940

WHITE TITANIUM DIOXIDE PIGMENT

Roy Dahlstrom, Metuchen, N. J., assignor to National Lead Company, New York, N. Y., a corporation of New Jersey Application December 24, 1936, Serial No. 117,492

12 Claims. (Cl. 134—58)

This invention relates to pigments having controlled light-reflectance properties and to methods for their manufacture.

As has been shown by A. C. Hardy (Handbook of Colorimetry, 1936, published by the Massachusetts Institute of Technology) and others, the color of any substance may be evaluated by means of a spectrophotometric analysis such as is described by Committee D—1 of the American Society of Testing Materials identified as Method D—307-30 and described along with other color and light-reflectance analysis methods in "Physical and Chemical Examinations of Paints, Varnishes, Lacquers and Colors," by H. A. Gardner, 7th edition, 1935, page 129 et seq. There is obtained from a spectrophotometric analysis certain data which shows the amount of light reflected by the material being analyzed at various wavelengths within the visible spectrum. This data may be used to express color graphically on a chart the ordinates of which quantitatively represent light-reflectance and the abscissa of which represent wavelengths of light within the visible spectrum. On such a chart a pure white substance will be represented by a straight line parallel to the abscissa near the top of the chart while a pure black substance will be represented by a straight line parallel with the abscissa near the bottom of the chart. Thus it will be seen that the difference between white and black is a quantitative difference in the amount of light reflected. Charts representing spectrophotometric data of color substances will consist of curved or sloping lines indicating an increased reflectance at one or more wavelengths.

With the development of scientific means for evaluating pigments most substances heretofore regarded as being pure white, for example, white pigments, have been found to possess an increased reflectance at certain wavelengths of the visible spectrum. Strictly speaking, such substances must be regarded as possessing a slight tint or tone, even though to the eye of the average observer such tint or tone is not detectable. Thus, white pigment has been found to possess increased reflectance at various wavelengths; some in the region of the long wavelengths, others in the middle regions and still others in the shorter wavelength regions. For use particularly in surface coating compositions white pigments having controlled light reflectance properties not deviating substantially from those of a pure white substance are desired. In many instances, white pigments possessing a slight increased reflectance in the regions of the short wavelengths are preferred. Such pigments are referred to as possessing a gray or blue-gray tone.

White titanium pigments when spectrophotometrically examined are found to possess varying reflectance at different wavelengths. This varying reflectance may be sufficiently pronounced to enable a trained pigment technologist to identify the pigment as possessing a distinctive tint or tone, for example, a yellow to red tone, a green or blue tone. The particular tint or tone which a white titanium pigment may possess may be due to one or more of several factors including the composition of the titaniferous raw material, method of manufacture, impurities present in the final product, etc. The preparation of a white titanium pigment having controlled reflectance properties has been an outstanding problem of the titanium pigment industry. A means for the solution of this problem represents one feature of my invention.

Furthermore, white titanium pigments are often found to be photosensitive and tend to discolor when exposed to light. By means of the present invention white titanium pigments are obtained which are stable to light.

Thus, one object of the present invention is a method for preparing titanium pigments possessing controlled light-reflectance properties. Another object of my invention is a means whereby white titanium pigments may be rendered stable against the action of light. These and other objects of the present invention will become apparent from the following description thereof:

Titanium pigments, as prepared at the present time, are obtained from the calcination of hydrous titanium oxide. Depending upon the composition of the titaniferous raw material employed in the manufacture of the pigment, or upon the method of treating the titanium material during the process of manufacture, the finished pigment may possess various tones. In copending Serial No. 98,082, filed August 26, 1936, in which I am a coinventor, there is disclosed a process for adding very small amounts of certain light-reflectance controlling agents, for example, tungsten and/or molybdenum, to titaniferous materials during the process of manufacture of white titanium pigment in order to impart to such pigment desirable light-reflectance properties.

My present invention is based upon the discovery that if hydrous titanium oxide containing only a trace of tungsten and/or molybdenum in an amount insufficient to impart desirable light-reflectance properties is exposed to a reducing atmosphere during calcination and/or cooled in a reducing atmosphere after calcination, the resulting white titanium dioxide pigment will possess a light-reflectance in the shorter wavelengths comparatively higher with respect to the reflectance in the longer wavelengths as compared with a similar pigment calcined and cooled in the regular prior manner. Thus, by means of the present invention titaniferous ores which contain no tungsten and/or molybdenum may be employed, in which case it is necessary in the practice of my invention to add to the titanium material a trace of these metals prior to calcination. My present invention also permits the use of a titaniferous raw material which would ordinarily yield pigments having undesirable yellow or red tones. By means of the present invention the yellow or red tones may be reduced to a point where it is no longer objectionable, or if desired, a blue tone may be imparted to the pigment obtained from such raw materials.

According to the present invention the period during which the hydrous titanium oxide containing a trace of tungsten and/or molybdenum is exposed at elevated temperatures to reducing conditions may be so regulated as to increase the reflectance in the shorter wavelengths relative to the reflectance in the longer wavelengths to any desired degree. This is true whether the exposure to the reducing conditions is made during calcination or during the cooling of the pigment. Preferably the exposure should be so regulated that the percent of light-reflectance at the shorter wavelengths within the visible spectrum (corresponding to blue) stands in relation to the percent of light-reflectance in the longer wavelengths within the visible spectrum (corresponding to red) in the ratio of 0.99:1.0 to 1.02:1.0. In general, the longer the duration of exposure and the higher the concentration of reducing constituents the greater will be the increase in reflectance in the shorter wavelengths. Thus, according to the present invention, white titanium pigments possessing light-reflectance properties which do not deviate substantially either in the relatively long or relatively short wavelengths from those of a pure white substance may be prepared from raw materials which would ordinarily yield pigments having an undesirably high reflectance in the longer wavelengths.

As stated above the presence of a trace of tungsten and/or molybdenum is essential in the operation of the present invention. Such trace may be so small as to defy detection by ordinary chemical analysis and to require spectrographic methods to determine their presence. By the term "hydrous titanium oxide containing a trace of tungsten and molybdenum", I mean hydrous titanium oxide containing as little as 0.001 percent or less of tungsten or molybdenum, based on the $TiO_2$ content of the hydrous titanium oxide. I have found that a hydrous titanium oxide containing as little as 0.0001 percent of either tungsten or molybdenum may be treated according to the methods of the present invention to yield a pigment having a desirable light-reflectance property.

The present invention is not to be confused with prior art disclosures for calcining hydrous titanium oxide in the presence of reducing agents or in a reducing atmosphere. Such methods lead to the production of blue pigments or to white pigments whose pigment properties have been adversely affected by the reducing calcination. As distinguished therefrom my invention does not maintain the reducing conditions throughout the calcination. In my invention, the hydrous titanium oxide containing a trace of tungsten or molybdenum is exposed during the calcination to a reducing atmosphere for only comparatively short duration of time sufficient to impart the desired light-reflectance properties. The improved results of my invention appear to depend upon the conjoint effect of the trace of tungsten and/or molybdenum on the one hand, and the reducing treatment on the other. Furthermore, the prior art contains no suggestion for exposing the calcined pigment during the cooling thereof to a reducing atmosphere.

The duration of the exposure of the hydrous titanium oxide during the calcination and the duration of exposure of the calcined pigment during the cooling to the reducing atmosphere is very short. Generally speaking, the duration will be inversely proportional to the concentration of the active reducing constituent in the atmosphere to which the hydrous titanium oxide during the calcination or the calcined pigment during the cooling, is exposed. For example, an exposure of from one second to five seconds at the temperature of calcination is usually sufficient to obtain the desired results. If the pigment is somewhat cooler than calcination temperature the period of exposure may have to be lengthened. Generally speaking, it is not desirable to permit the pigment to cool below 700° C. before exposing it to the reducing agent. It will be understood, of course, that it is impossible to state exactly strict limits of the duration of exposure and the concentration, due to the wide variation in composition of titaniferous raw material as well as in calcination and cooling methods. One skilled in the art will be able readily to determine suitable conditions from the description of my invention as herein given.

In the present processes of manufacturing titanium pigment, hydrous titanium oxide is heat-treated in a rotary calciner at an elevated temperature of usually between 800° C. and 1000° C. One convenient method of practicing the present invention is to introduce a small amount of a reducing gas, for example, hydrogen or carbon monoxide, into the calciner toward the end of the heat treatment, at which time the hydrous titanium oxide has been substantially completely converted to hydrous titanium dioxide. Another method of practicing the present invention is to permit the hot pigment, as it issues from the calciner, to drop through a reducing atmosphere. A third method is to reheat the pigment at an elevated temperature, for example, that employed in the calcination and to permit the pigment to cool in a reducing atmosphere. The selection of any of the above noted methods will depend, among other things, upon the composition of the titaniferous ore being treated and upon the calcining and cooling methods, and those skilled in this art can readily determine which manner of practicing my invention is best adapted for their individual requirements.

Examples of reducing gases useful in the practice of the present invention are hydrogen, carbon monoxide, water gas and the like. It is possible in some instances to add a small amount of carbonaceous material to the hydrous titanium oxide containing a trace of tungsten and/or molybdenum to the hot pigment as it issues from the calciner. This carbonaceous material, upon ignition, will liberate sufficient reducing gases to obtain the improved results of the present invention.

An example of the practice of my invention is as follows:

Example No. 1

A quantity of hydrous titanium oxide containing 50 grams of $TiO_2$ and a trace of tungsten, was calcined in a scorifier for about two hours at about 950° C. During this heating a second scorifier was inverted over that containing the pigment to serve as a cover. At the end of the calcination the sample was removed from the furnace and approximately 5 cc. of hydrogen at standard temperature and pressure was introduced without removing the cover. Upon cooling, the pigment was found to possess a neutral white tone.

The product of this example was subjected to a light-reflectance analysis in a Hunter Reflectometer as described in "Physical and Chemical Examinations of Paints, Varnishes, Lacquers, Colors", by Gardner, 7th edition, 1935, pages 101–4. A comparison of the results obtained from this analysis as compared with a sample of the same pigment, calcined in the identical manner, but allowed to cool in the prior art manner is given in Figure 1 and Figure 2, Table A, attached hereto. It will be noted that whereas the prior art sample (Pigment No. 1) has a comparatively high reflectance value at the longer, or red, wavelength portions of the visible spectrum, the product of Example No. 1 (Pigment No. 2) gives a straight line indicative of a neutral white pigment.

White titanium pigments prepared as herein described not only possess controlled light-reflectance properties but are stable against the action of light. Thus, by means of my present invention, a two-fold improvement in titanium pigments is attained, viz., controlled light-reflectance properties and stability to photochemical changes.

A characteristic feature of the present invention is that it appears to influence primarily the light-reflectance properties of pigments prepared thereby in the longer wavelength portion of visible spectrum, i. e., in the red portion. This is best illustrated by Figure 3 and Figure 4, Table B, attached hereto.

As shown in Figure 3 and Figure 4, Table B, the blank (Pigment No. 3) is a sample of titanium dioxide calcined and cooled in the regular prior art way. Pigment No. 4 is a similar pigment, calcined in the same way, but exposed during the cooling period to a reducing atmosphere for 2 seconds. Pigment No. 5 is a similar pigment, also calcined in the regular manner, but exposed during the cooling period to a reducing atmosphere for 3 seconds. It will be noted how the reflectance at the wavelengths of about 620 millimicrons is progressively decreased with the increasing exposure to the reducing atmosphere.

It will be understood that increasing the reflectance in the shorter wavelengths while decreasing the reflectance in the longer wavelengths (Pigment No. 2—Figure 1) or simply decreasing the reflectance in the longer wavelengths (Pigments Nos. 4 and 5, Figure 3) produces the same result, namely, increasing the reflectance in the shorter wavelengths relative to the reflectance in the longer wavelengths. In neither case, as can be seen from the results tabulated in Figure 2, Table A and Figure 4, Table B, is the brightness, i e. the average total light reflected at all wavelengths substantially and materially reduced.

Although my invention is primarily adapted to the preparation of white titanium dioxide pigments which consist of substantially pure titanium dioxide it is also adapted to the preparation of white composite titanium dioxide pigments, such as titanium dioxide-barium sulfate or titanium dioxide-calcium sulfate composite pigments, whether prepared by coprecipitation or other methods.

The products of my invention are characterized as possessing predetermined light-reflectance properties so adjusted that if the percent light reflected at the longer wavelengths within the visible spectrum, that is, at about a wavelength of about 620 millimicrons, is considered as 1.0, the percent light reflected at the shorter wavelengths with the visible spectrum, that is, about 490 millimicrons, will be within a ratio of about 0.99:1.0 to 1.02:1.0. Since the shorter wavelengths correspond to the color blue and the longer wavelengths correspond to the color red, the products of my invention will exhibit somewhat increased reflectance within the wavelengths corresponding to blue, in relation to the reflectance in the wavelengths corresponding to red when compared with the reflectance properties of untreated white titanium dioxide pigments.

The foregoing description has been given for clearness of understanding and no undue limitations should be deduced therefrom, but the appended claims should be interpreted as broadly as possible in the light of the prior art.

I claim:

1. A method for increasing the reflectance of a white titanium dioxide pigment in the shorter wavelengths of the visible spectrum relative to the reflectance of the said pigment in the longer wavelengths of the visible spectrum which comprises exposing said white titanium dioxide pigment containing between 0.001 percent and 0.0001 percent of at least one of the elements selected from the group consisting of tungsten and molybdenum to hydrogen gas at a temperature of about 900° C. for approximately one to five seconds as required to increase the light reflectance in the shorter wavelengths of the visible spectrum relative to the reflectance in the longer wavelengths without materially reducing the average total light reflected at all wavelengths.

2. A method for increasing the reflectance of a white titanium dioxide pigment in the shorter wavelengths of the visible spectrum relative to the reflectance of the said pigment in the longer wavelengths of the visible spectrum which comprises exposing said white titanium dioxide pigment containing between 0.001 percent and 0.0001 percent of at least one of the elements selected from the group consisting of tungsten and molybdenum to carbon monoxide at a temperature of about 900° C. for approximately one to five seconds as required to increase the light reflectance in the shorter wavelengths of the visible spectrum relative to the reflectance in the longer wavelengths without materially reducing the average total light reflected at all wavelengths.

3. A method for increasing the reflectance of a white titanium dioxide pigment in the shorter wavelengths of the visible spectrum relative to the reflectance of the said pigment in the longer wavelengths of the visible spectrum which comprises exposing a white titanium dioxide pigment containing a trace of at least one of the elements selected from the group consisting of tungsten and molybdenum to reducing conditions at temperatures between about 700° C. and about 1000° C. until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

4. A method for increasing the reflectance of a white titanium dioxide pigment in the shorter wavelengths of the visible spectrum relative to the reflectance of the said pigment in the longer wavelengths of the visible spectrum which comprises exposing said white titanium dioxide pigment containing between 0.001 percent and 0.0001 percent of at least one of the elements selected from the group consisting of tungsten and molybdenum to reducing conditions at a temperature of about 900° C. until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

5. A method for increasing the reflectance of a white titanium dioxide pigment obtained from the calcination of hydrous titanium oxide in the shorter wavelengths of the visible spectrum relative to the reflectance of the said pigment in the longer wavelengths of the visible spectrum which comprises calcining hydrous titanium oxide containing a trace of at least one of the elements selected from the group consisting of tungsten and molybdenum at temperatures between 900° C. and 1000° C. and after calcination before the said pigment has cooled below 700° C. exposing the cooling pigment to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

6. A method for increasing the reflectance of a white titanium dioxide pigment obtained from the calcination of hydrous titanium oxide in the shorter wavelengths of the visible spectrum relative to the reflectance of the said pigment in the longer wavelengths of the visible spectrum which comprises heating hydrous titanium oxide containing a trace of at least one of the elements selected from the group consisting of tungsten and molybdenum to a temperature between 900° C. and 1000° C. and while maintaining the said hydrous titanium oxide within this temperature range to convert it into anhydrous titanium dioxide exposing the material being calcined to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

7. A method for increasing the reflectance of a white titanium dioxide pigment in the shorter wavelengths of the visible spectrum relative to the reflectance of the said pigment in the longer wavelengths of the visible spectrum which comprises heating a previously calcined titanium dioxide pigment containing a trace of at least one of the elements selected from the group consisting of tungsten and molybdenum to temperatures between 700° C. and 1000° C. and while at such temperatures, exposing the said pigment to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

8. A method for increasing the reflectance of a white titanium dioxide pigment obtained from the calcination of hydrous titanium oxide in the shorter wavelengths of the visible spectrum relative to the reflectance of the said pigment in the longer wavelengths of the visible spectrum which comprises calcining hydrous titanium oxide containing between 0.001 percent and 0.0001 percent of at least one of the elements selected from the group consisting of tungsten and molybdenum at temperatures between 900° C. and 1000° C. and after calcination before the said pigment has cooled below 700° C. exposing the cooling pigment to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

9. A method for increasing the reflectance of a white titanium dioxide pigment obtained from the calcination of hydrous titanium oxide in the shorter wavelengths of the visible spectrum relative to the reflectance of the said pigment in the longer wavelengths of the visible spectrum which comprises calcining hydrous titanium oxide containing between 0.001 percent and 0.0001 percent of at least one of the elements selected from the group consisting of tungsten and molybdenum at temperatures between 900° C. and 1000° C. and exposing the titanium dioxide so produced at the end of the calcining treatment to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

10. A method for increasing the reflectance of a white titanium dioxide pigment in the shorter wavelengths of the visible spectrum relative to the reflectance of the said pigment in the longer wavelengths of the visible spectrum which comprises heating a previously calcined titanium dioxide pigment containing between 0.001 percent and 0.0001 percent of at least one of the elements selected from the group consisting of tungsten and molybdenum to temperatures between 700° C. and 1000° C. and while at such temperatures, exposing the said pigment to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

11. In a method for the manufacture of a white titanium dioxide pigment having increased reflectance in the shorter wavelengths of the visible spectrum relative to the reflectance of the said pigment in the longer wavelengths of the visible spectrum which includes a calcination treatment followed by a cooling of the titanium dioxide so produced, the step which consists in exposing a calcined titanium dioxide pigment containing a trace of at least one of the elements selected from the group consisting of tungsten and molybdenum after calcination before said pigment has cooled below 700° C. to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

12. In a method for the manufacture of a white titanium dioxide pigment having increased reflectance in the shorter wavelengths of the visible spectrum relative to the reflectance of the said pigment in the longer wavelengths of the visible spectrum which includes a calcination treatment of hydrous titanium oxide, the step which consists in exposing a titanium dioxide pigment containing a trace of at least one of the elements selected from the group consisting of tungsten and molybdenum during the calcination toward the end of the said calcination treatment at temperatures between 900° C. and 1000° C. to reducing conditions until the reflectance in the shorter wavelengths of the visible spectrum compared with the reflectance in the longer wavelengths taken as 1 stand in the relation of between about 0.99 to 1 and about 1.02 to 1 without materially reducing the average total light reflectance at all wavelengths.

ROY DAHLSTROM.